United States Patent

Waller et al.

[11] 4,011,455
[45] Mar. 8, 1977

[54] PHOSPHOR SCREEN

[75] Inventors: Alan Hugh Waller, Rayleigh; Peter Charles Sangway, Upminster, both of England

[73] Assignee: Ciba-Geigy AG, Basel, Switzerland

[22] Filed: Mar. 22, 1976

[21] Appl. No.: 669,353

[30] Foreign Application Priority Data

Apr. 4, 1975 United Kingdom ............ 13885/75

[52] U.S. Cl. .................... 250/486; 252/301.4 S
[51] Int. Cl.² ........................................ G01J 1/58
[58] Field of Search ............ 252/301.4 S; 250/486, 250/483, 460

[56] References Cited
UNITED STATES PATENTS

| | | | |
|---|---|---|---|
| 3,650,976 | 3/1972 | Luckey | 252/301.4 S |
| 3,778,615 | 12/1973 | Luckey | 252/301.4 S |
| 3,795,814 | 3/1974 | Rabatin | 250/483 |
| 3,936,644 | 2/1976 | Rabatin | 250/486 |

Primary Examiner—Harold A. Dixon
Attorney, Agent, or Firm—Joseph G. Kolodny; Edward McC. Roberts; Prabodh I. Almaula

[57] ABSTRACT

This invention relates to phosphor screens for converting X-rays into visible or near visible radiation. The screens comprise in a fluorescent layer a phosphor mixture which consists of a fluorohalide corresponding to the formula $$[Ba_{(1-x-y-p)} Sr_x Ca_y Eu_p] F [Cl_{(1-a-b)} Br_a I_b] \quad (1)$$

wherein
$y \leq 0.2$
$x + y + p \leq 1$
$a + b \leq 1$
$0.001 \leq p \leq 0.2$ together with calcium tungstate or an oxychalcogenide of the formula $$[M_{(1-x)} A_x]_2 O_2 Ch \quad (2)$$

wherein M is a rare earth host element, A is a rare earth element different from M and which has an atomic number from 55 to 71, Ch is sulphur, selenium or tellurium and $0.001 \leq x \leq 0.2$.

10 Claims, No Drawings

PHOSPHOR SCREEN

Screens which convert X-rays to visible or near visible radiation are of particular use in radiography in which patients are exposed to X-radiation which is then converted to light by a phosphor intensifying screen. An X-ray film is exposed to the light emitted by the intensifying screen. The X-ray film yields after development an X-ray picture of the exposed portion of the patient. In recent years it has been realised that patients should be exposed to as little X-radiation as possible because exposure to X-rays can cause organic damage in the tissues of the patient.

Recently the use of new rare-earth-based phosphors in X-ray intensifying screens has been described. These phosphors are more efficient than calcium tungstate which has been used in X-ray intensifying screens since 1896 and the use of such screens enables the exposure of the patient to X-rays to be considerably reduced.

X-ray intensifying screens containing gadolinium oxysulphide activated with terbium or lanthanum oxysulphide activated with terbium or a mixture of these two phosphors enable exposures to X-rays to be reduced by a factor of at least four without loss of sharpness in the developed X-ray film. These phosphors emit predominantly green light and are normally used with green-sensitive X-ray films.

Screens containing a single phosphor emitting predominantly blue or ultra-violet light, to which an X-ray film is naturally sensitive, for example yttrium oxysulphide activated with terbium or barium fluoro-chloride activated with europium, allow similar exposure reductions.

However, the exposure reduction achieved by the use of screens containing a single phosphor depends on the energy distribution of the X-radiation incident on the screens which in turn depends on the voltage applied to the X-ray tube and on the X-ray absorption of the patient. Thus, with single-phosphor screens, the exposure reduction varies according to the nature of the X-ray examination that is being performed.

Furthermore, yttrium oxysulphide phosphor has relatively poor X-ray absorption so that radiographs produced by screens containing only yttrium oxysulphide are degraded by quantum mottle.

The phosphor mixture according to the present invention when incorporated in X-ray intensifying screens allows exposure reductions greater than those obtained when the same phosphors are used singly. Furthermore, the phosphor mixtures have good X-ray absorptions and the exposure reductions are less dependent on the energy distribution of the incident X-radiation.

Therefore according to the present invention there is provided an X-ray intensifying screen which comprises in a fluorescent layer a phosphor mixture which consists of an alkaline earth fluorohalide activated with divalent europium having the empirical formula

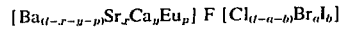  (1)

where
$y \leq 0.20$
$x + y + p \leq 1$
$a + b \leq 1$
$0.001 \leq p \leq 0.20$ together with at least one phosphor which is either calcium tungstate or which is a rare earth oxychalcogenide having the empirical formula

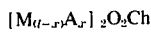  (2)

wherein M is at least one rare earth host element, A is an activator which is a rare earth element different from M and which has an atomic number from 59 to 71, Ch is sulphur, selenium or tellurium and $0.001 \leq x \leq 0.2$.

The preferred alkaline earth fluorohalide of formula I for use in the X-ray intensifying screens of the present invention are those wherein $y$ is 0 is to say no calcium is present. A particularly suitable alkaline earth fluorohalide for use in the present invention can be written as $Ba_{(1-p_1)}FCl(Eu_{p_1})$ which indicates barium fluorochloride containing a small amount of europium as activator. Preferably $p_1$ is 0.02 to 0.05.

The preferred mixture of phosphors for use in the present invention is one alkaline earth fluorohalide of formula (1) and at least one mixed rare earth oxychalcogenide of formula (2).

With reference to the mixed rare earth oxychalcogenide of formula (2), by rare earth element is meant yttrium and an element having an atomic number of from 57 – 71. By host is meant the rare earth element which is responsible for the crystalline form of the phosphor. It is possible that M may comprise two or more elements forming a mixed crystal host but preferably the host element M is a single rare earth.

The activator element A is present in much smaller quantities than the host element M. Preferably $x$ is not more than 0.1. Examples of suitable host elements M are lanthanum, gadolinium, yttrium and lutetium, of these gadolinium and yttrium are especially suitable.

Examples of rare earth activators A are praeseodymium, europium, dyprosium, ytterbium, thulium, terbium and samarium. Of these the most preferred activator is terbium.

The preferred chalcogenide Ch is sulphur.

Thus the most preferred rare earth oxychalcogenides for use in the present invention can be written as $Gd_2O_2S(Tb)$ which indicates gadolinium oxysulphide containing a small amount of terbium as activator and $Y_2O_2S(Tb)$ which indicates yttrium oxysulphide containing a small amount of terbium as activator.

Preferably in the phosphor mixture used in the X-ray screens of the present invention there is from 10–90% by weight of the alkaline earth fluorohalide and from 90–10% by weight of the other phosphor or phosphors.

The particle size of the phosphors used is preferably within the range of $1\mu$ to $40\mu$.

X-ray intensifying screens usually comprise a dimensionally stable support base there being present thereon in order, a light reflecting layer (optional), a fluorescent layer and a protective layer. The light reflecting layer (if present) usually comprises particles of a light reflecting substance e.g. baryta or titanium dioxide in a polymeric binder. The fluorescent layer comprises particles of the phosphor in a polymeric binder. In order to protect the surface of the fluorescent layer a protective layer which is usually a transparent polymeric substance is coated onto the fluorescent layer. If the dimensionally stable support used is transparent for instance if poly-ester is used it is not necessary for a light reflecting layer to be present between the base support and the fluorescent layer. In this case the light reflective layer (if used) may be present on the side of the base support distal to the fluorescent layer or separate light reflecting means may be used in conjunction with the intensifying screen.

In the X-ray intensifying screen of the present invention the fluorescent layer comprises particles of the phosphor mixture hereinbefore defined.

The X-ray intensifying screens of the present invention may be prepared by mixing the selected phosphors in powder form to obtain a homogeneous mixture and then dispersing this mixture in a solution of a suitable binder. The phosphor dispersion is then coated on a suitable stable base and dried.

The protective layer may then be coated on the dried phosphor layer.

A suitable coating weight of the mixed phosphors in the fluorescent layer is from $2-20g/dm^2$.

Suitable base materials are card, cellulose esters, for example cellulose triacetate, polyesters for example polyethylene terephthalate and in particular so-called voided polyester as described in British patent specification No. 1,415,686.

Suitable reflective layers, which may be present between the usually opaque base and the fluorescent layer, are a layer containing titanium dioxide or a metallic layer for example a thin film of aluminium or silver evaporated on to the base.

Suitable binders for the phosphor mixture are cellulose esters for example cellulose acetate, cellulose triacetate, cellulose acetate butyrate, cellulose nitrate, polyvinyl compounds for example polyvinyl chloride and polyvinyl butyral and copolymers of vinyl compounds and solvent-soluble polyesters.

Preferably as high a proportion as possible of phosphor to binder should be present in the fluorescent layer while ensuring that the fluorescent layer has adequate strength and does not crack after some usage. Preferably the proportion of mixed phosphors to binder used in the fluorescent layer is from 40 of mixed phosphors to 1 of binder to 25 of mixed phosphors to 1 of binder, the ratios being by weight.

The protective layer may be of any of the usual polymeric compounds employed for this purpose for example cellulose acetate, cellulose nitrate or polymethyl methacrylate.

There may be present in the phosphor mixture layer a plasticizer for example triphenyl phosphate, tricresyl phosphate, dialkyl phthalates, dimethyl glycol phthalate and alkyl adipates.

There may be present either in at least one of the phosphor layer, protective layer or light-reflecting layer acutance dyes or pigments which help to increase the sharpness of the image by reducing light scatter and light reflection.

It is to be understood that a light-reflecting layer which comprises light reflective particles in a polymeric binder may be cast first on to the dimensionally stable support before the fluorescent layer is cast on to this support. If the base support is transparent the fluorescent layer may be coated on to the other side of the support to the light reflecting layer. The preferred base is polyester and it is usually required that the polyester base is comparatively thick compared with a base used for photographic purposes that is to say the base used should be in the region of 0.025 cm.

The X-ray screens of the present invention may be used as a pair on each side of a double-coated X-ray film or as a single screen in contact with the coated side of a single-sided X-ray film as used for example in mammography. The X-ray film may be sensitive to blue light only or to green and blue light. A green-sensitive film may be preferred for use with intensifying screens containing one or more green-emitting phosphors as components of the mixture when it is desirable to achieve the maximum possible exposure reduction.

By use of the mixed-phosphor X-ray intensifying screens of the present invention it is possible to reduce X-ray exposure to the patient to a greater extent than would be expected from a study of the results obtained when the phosphors are used singly in an X-ray intensifying screen.

The X-ray intensifying screens of the present invention also have greater uniformity of X-ray absorption across the range of X-ray energies employed in medical radiography. Thus the exposure reduction and quantum mottle, when the screens are used, is more consistent relative to conventional screens containing calcium tungstate than would be the case with screens containing single rare-earth phosphors. Furthermore the sharpness or definition of the mixed-phosphor screens is often greater than would be obtained if the phosphors were used singly.

EXAMPLE 1

Particles of barium fluorochloride phosphor activated with europium wherein the europium was present to the extent of 5.0 mol% that is to say $p$ in formula (1) would be 0.05 were mixed with particles of gadolinium oxysulphide phosphor activated with terbium, where terbium was present to the extent of 0.4 mol% that is to say $x$ in formula (2) would be 0.004, in the ratio 1:1 of the two phosphors. The resulting mixture was mixed with a solution of cellulose nitrate polymeric binder in acetone at a ratio of 33:1 binder to phosphor by weight and applied to a treated polyester sheet at a density of 6g per sq. dm. to produce intensifying screens. These are referred to as screens 1.

Screens 2 were prepared similarly except that the only phosphor used was the barium fluorochloride activated with europium.

Screens 3 were prepared similarly except that the only phosphor used was the gadolinium oxysulphide activated with terbium.

Screens 4 were prepared similarly except that the phosphor used was calcium tungstate alone; the calcium tungstate being used at the same binder ratio and density as the phosphor in Screens 1-3.

These screens were tested employing a pair of each of the screens 1-4 in an X-ray cassette and placing in one test a green sensitised version of a double-coated silver halide emulsion X-ray film between each pair of screens.

In another test the same procedure was carried out for screens 2 and 4 using the standard version of the X-ray film (i.e. non-spectrally sensitised and therefore solely blue-sensitive because these screens would normally be used with such films).

The tests consisted of the determination of the minimum exposure required to obtain a clear image of a pelvis phantom using 70kVp X-radiation from a tungsten anode source with an inherent filtration equivalent to 2m.m. of aluminium. The results are shown below in Table I.

Table I.

| Screens employed | 1 | 2 | 3 | 4 | 2 | 4 |
|---|---|---|---|---|---|---|
| Film employed | Green Sensitive. | Green Sensitive. | Green Sensitive. | Green Sensitive. | Standard | Standard |
| Minimum exposure* to obtain correctly exposed film in milliampere seconds. | 26 | 35 | 31 | 100 | 31 | 100 |

*The distance of the X-ray source was adjusted to give an exposure of 100 milliampere seconds for screens 4 and this distance was used for the other screens.

These results show that when the phosphor mixture of barium fluorochloride and gadolinium oxysulphide of the present invention is used it is possible to produce correctly exposed images of a subject using significantly reduced exposures with a consequently lower risk to a patient.

EXAMPLE 2

Particles of barium fluorochloride phosphor activated with europium as described in Example 1 were mixed with particles of yttrium oxysulphide phosphor activated with terbium to the extent of 0.4 mole% that is to say $x$ in formula (2) would be 0.004, the phosphor mixture being in the ratio of 1:1. The resulting mixture was coated on treated polyester base using a solution of a polymeric binder in the same manner as described in Example 1 and at the same coating density.

The resulting sheets are referred to as screens 6. Screens 7 were prepared similarly except that the only phosphor used was the yttrium oxysulphide activated with terbium used in screen 6.

These screens were tested as in Example 1 to determine the minimum exposure required to obtain a clear image of a pelvis phantom using 70 kVp X-radiation. Further tests were also carried out with 35, 50, 90 and 110 kVp X-radiation, the experiment being otherwise similar. For the purpose of comparison the test was carried out on pairs of each of the screens 6 and 7 and also 2 and 4 from Example 1, a sheet of standard X-ray film being placed therebetween as described in Example 1 and the correct exposures being determined.

The results are shown in Table II.

Table II.

| Screens employed | 6 | 7 | 2 | 4 |
|---|---|---|---|---|
| Film employed | Standard | Standard | Standard | Standard |
| Minimum exposure* to obtain correctly exposed films in milliampere seconds at the following kVp | 35 | 26 | 28 | 100 |
| | 50 | 26 | 28 | 36 | 100 |
| | 70 | 24 | 29 | 31 | 100 |
| | 90 | 25 | 34 | 32 | 100 |
| | 110 | 26 | 42 | 33 | 100 |

*The distance of the X-ray source was adjusted to give an exposure of 100 milliampere seconds for screens 4 in each case, and this distance used for the other screens.

These results show that when the phosphor mixture barium fluorochloride and yttrium oxysulphide of the present invention is used it is possible to produce correctly exposed images of a subject using significantly reduced exposures at 70 kVp which is in the middle of a generally used medical X-ray energies. Moreover this combination provides a significantly reduced exposure at a ratio relative to the calcium tungstate based on screens 4 which remains nearly constant (unlike that for screens using the phosphors singly) over the range of energies 35 kVp to 110 kVp, this range covering all the usually used medical energies. Thus not only would the use of these screens reduce the exposure of human subjects to X-radiation in producing correctly exposed images but it would do so by a simple relationship by employing one quarter of the exposure required for a calcium tungstate screen at all the normal kVp energies. Since the calcium tungstate screens are in use in most medical X-ray applications this would greatly ease the problems of introducing such mixed phosphor screens into clinical use.

What we claim is:

1. An X-ray intensifying screen which comprises in a fluorescent layer a phosphor mixture which consists of an alkaline earth fluorohalide activated with divalent europium having the empirical formula $$[Ba_{(1-x-y-p)}Sr_xCa_yEu_p] F [Cl_{(1-a-b)}Br_aI_b]$$

where
$y \leq 0.20$
$x + y + p \leq 1$
$a + b \leq 1$
$0.001 \leq p \leq 0.20$
together with at least one phosphor which is either calcium tungstate or which is a rare earth oxychalcogenide having the formula $$[M_{(1-x)}A_x]_2 O_2Ch$$

wherein M is at least one rare earth host element, A is an activator which is a rare earth element different from M and which has an atomic number from 59 to 71, Ch is sulphur, selenium or tellurium and $0.001 \leq x \leq 0.2$.

2. An X-ray intensifying screen according to claim 1 wherein $y$ in the formula of the alkaline earth fluorohalide is 0.

3. An X-ray intensifying screen according to claim 1 which comprises in a fluorescent layer a phosphor mixture which consists of a barium fluorohalide activated with divalent europium having the formula $Ba_{(1-p_1)}FCl(Eu_{p_1})$ where $0.001 \leq P_l \leq 0.20$ together with at least one phosphor which is either calcium tungstate or which is a rare earth oxychalcogenide having the formula $[M_{(1-x)}A_x]_2 O_2Ch$ wherein M is at least one rare earth host element, A is an activator which is a rare earth element different from M and which has an atomic number from 59 to 71, Ch is sulphur, selenium or tellurium and $0.001 \leq x \leq 0.2$.

4. An X-ray intensifying screen according to claim 3 where $0.02 \leq p \leq 0.05$.

5. An X-ray intensifying screen according to claim 1 wherein M is lanthanum, gadolinium, yttrium or lutetium.

6. An X-ray intensifying screen according to claim 1 where in the formula of the rare earth oxychalogenide as defined in claim 1 A represents praeseodymium, europium, dyprosium, ytterbium, terbium, samarium or thulium.

7. An X-ray intensifying screen according to claim 1 where in the formula of the rare earth oxychalogenide as defined in claim 1 Ch represents sulphur.

8. An X-ray intensifying screen according to claim 1 which comprises a phosphor mixture which consists of barium fluorchloride containing a small amount of europium as activator and which has the formula BaFCL(Eu)

together with either gadolinium oxysulphide containing a small amount of terbium as activator and which has the formula $Gd_2O_2S(Tb)$ or yttrium oxysulphide containing a small amount of terbium as activator and which has the formula $Y_2O_2S(Tb)$.

9. An X-ray intensifying screen according to claim 1 which comprises a dimensionally stable support base there being present thereon in order a light reflecting layer (optional), a fluorescent layer which comprises in a binder a phosphor mixture as defined in claim 1 and a protective layer.

10. An X-ray intensifying screen according to claim 9 wherein the coating weight of the mixed phosphors in the fluorescent layer is from 2–20 g/dm².

* * * * *